United States Patent [19]
Pollack

[11] Patent Number: 5,816,182
[45] Date of Patent: Oct. 6, 1998

[54] TENSION MOORING SYSTEM

[75] Inventor: Jack Pollack, Calabasas Hills, Calif.

[73] Assignee: Imodo, Inc., Calabasas Hills, Calif.

[21] Appl. No.: 739,892

[22] Filed: Oct. 30, 1996

[51] Int. Cl.$^6$ ................................................. B63B 21/00
[52] U.S. Cl. ........................ 114/230; 114/144 B; 114/293
[58] Field of Search ..................................... 114/293, 144, 114/230

[56] References Cited

U.S. PATENT DOCUMENTS

| | | | |
|---|---|---|---|
| 3,154,854 | 11/1964 | Shatto, Jr. et al. | 114/144 B |
| 3,386,407 | 6/1968 | Mount | 114/29.3 |
| 3,422,783 | 1/1969 | Moulin | 114/230 |
| 4,070,981 | 1/1978 | Guinn et al. | 114/144 B |
| 4,088,089 | 5/1978 | Flory | 114/230 |
| 4,200,052 | 4/1980 | Cunningham et al. | 114/144 B |
| 4,531,471 | 7/1985 | Hunsucker | 114/293 |
| 5,107,784 | 4/1992 | Lacy | 114/263 |
| 5,178,807 | 1/1993 | O'nion et al. | 114/230 |
| 5,265,553 | 11/1993 | Brydges | 114/230 |
| 5,390,618 | 2/1995 | Wolff | 114/230 |

*Primary Examiner*—Sherman Basinger
*Attorney, Agent, or Firm*—Freilich Hornbaker Rosen

[57] ABSTRACT

An offshore system is described that minimizes mooring loads attributable to oscillating wave drift. A tension member (24, FIG. 1), such as a chain, has a lower end (32) fixed to the seafloor and has an upper end portion (40) coupled to the vessel (12), so wave drift that occurs in a storm and urges vessel drift away from a quiescent position, is resisted by tension in the tension member. To reduce the load on the tension member, the vessel is allowed to move while paying out the tension member so it elongates. However, a brake mechanism (70) is applied to the tension member being payed out to slowly pay it out and absorb energy, to thereby damp vessel movement and minimize the maximum mooring load on the tension member. Preferably, at least three tension members (24, 26, 28) extend in different headings from the vessel to fixed locations on the seafloor, so a tension member that is resisting vessel drift extends at a large angle (C) to the vertical.

18 Claims, 5 Drawing Sheets

TENSION MOORING SYSTEM

BACKGROUND OF THE INVENTION

Ocean storm waves are typically 150 to 300 meters long. A vessel whose length is of the same order of magnitude as the ocean waves, experiences large wave drift loads resulting from the combined forces of numerous successive waves, with the wave drift load oscillating at a period on the order of 100 seconds. The oscillating wave load can be the largest load on a large vessel, which is a vessel of a length of over 15 meters and a displacement of more than 10 tons and usually more than 50 tons. It is noted that for small vessels of less than then 10 tons, the major forces on the vessel are currents, waves, and short duration forces (usually less than 10 seconds) caused by individual waves, but there is not considerable long term oscillating (at periods on the order of 100 seconds) wave loads.

Most large vessels are currently moored through the use of long catenary chains that extend down to the seafloor and hundreds of meters along the seafloor to an anchor. In a storm, mooring loads resulting from winds, currents and the non-oscillating wave drift load, are countered by the vessel drifting and picking up chain from the seafloor, which gradually increases chain tension. Oscillating wave drift loads, which have a period on the order of 100 seconds, are resisted by the vessel picking up even more chain from the seafloor when the wave drift load is highest, and drifting back while chain settles on the seafloor when the oscillating wave drift load decreases. One disadvantage of this type of system, is that the vessel undergoes considerable repeated drift in a storm as large lengths of chain are repeatedly pulled off the seafloor and laid back on the seafloor with variation in wave drift load. It is common for offshore systems to include fluid-carrying conduits such as hoses that extend from the vessel down to the seafloor. Such conduits must be made long enough to account for maximum vessel drift. The considerable bending that they are repeatedly subjected to, increases the possibility of fatigue failure. It would be desirable if vessel drift could be minimized.

Large vessel mooring systems have natural frequencies of oscillations in drift away from and towards a quiescent position, with periods on the order of magnitude of 100 seconds. If the oscillation wave drift force has a period close to that of the natural frequency of the system, then there will be large excursions of the vessel and large loads on the mooring chains. Vessel drift is naturally damped by resistance of the vessel to movement in the water, friction of chains as they are pulled tighter, etc. However, the damping is only about 10%. As a result, when the oscillation wave drift load is close to the natural frequency of the system, the vessel drift and mooring load may be five times as great as it would be for a 50% to 100% damped system. Of course, offshore systems must be designed for worse case conditions, which assume that the oscillation wave drift load is of the same period as that of the offshore system.

Apparatus for mooring a large vessel (over 10 tons and usually over 50 tons, with a length of over 15 meters), which minimized vessel drift, which minimized loads on tension members, and which minimized the required lengths of such tension members, would be of value.

SUMMARY OF THE INVENTION

In accordance with one embodiment of the present invention, an offshore system is provided that includes a vessel and mooring apparatus for mooring the vessel, wherein the mooring apparatus can minimize the mooring load on a tension member, minimize the length of tension member(s), and minimize vessel drift. The system includes at least one tension member having a lower portion coupled to the seafloor, preferably at a fixed location, and having an upper portion coupled to the vessel to be moored. A brake mechanism is connected to the upper portion of the tension member. The brake mechanism is constructed to payout and draw in the upper portion of the tension member as the vessel drifts away from and moves back towards a quiescent position. The brake mechanism is also constructed to apply a braking force that resists payout of the tension member to absorb energy from the system as the tension member is slowly payed out and the vessel drifts, to damp the system. The damping minimizes total vessel drift and maximum mooring load on the tension member, in the event that the oscillating wave drift load is close to the natural frequency of the system.

The system preferably includes a plurality of tension members extending in different headings from the vessel, each at a downward incline towards the seafloor, and with the lower ends of the tension members fixed to the seafloor. As a result, vessel drift in any direction is immediately resisted by at least one tension member, whose upper end portion is payed out and braked.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
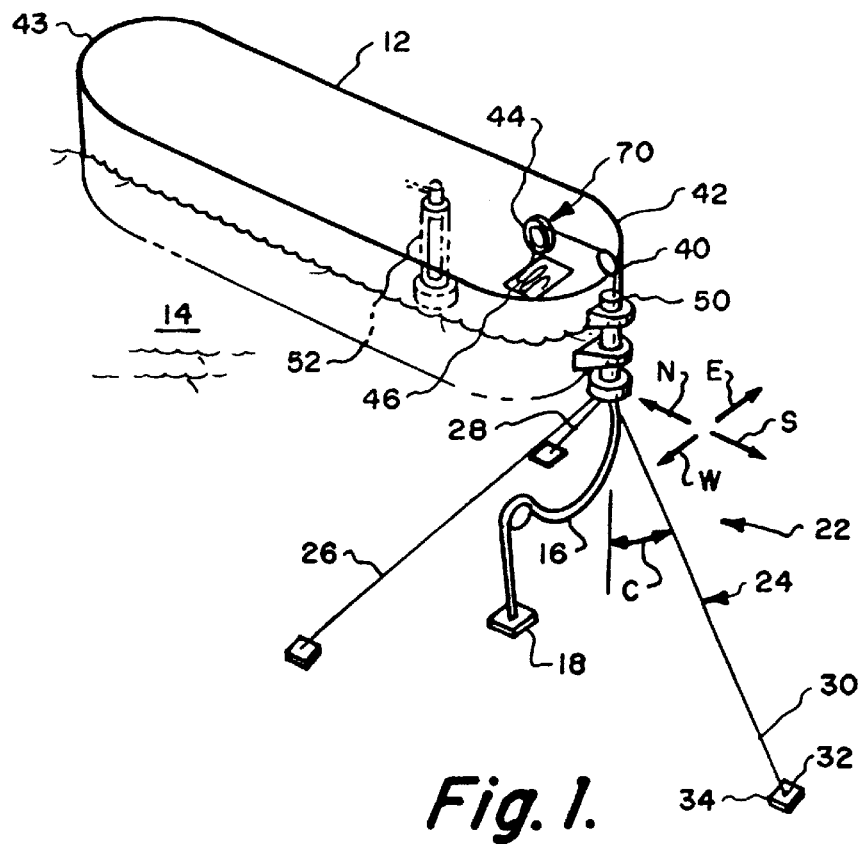
FIG. 1 is an isometric view of an offshore system of the present invention, shown in a quiescent position.

FIG. 1 illustrates an offshore system 10 which includes a vessel 12 that floats at the sea surface 14 and which is connected by a fluid conduit 16 to a fluid base 18 on the seafloor 20. The fluid base 18 may be connected to undersea wells, a pipeline, etc. Apparatus 22 for mooring the vessel, includes three tension elements or members 24, 26, 28, which each may be in the form of a chain, cable, etc. Each tension member, or mooring member, has a lower portion 30 with a lower end 32 that is fixed to the seafloor, as through a pile 34. It can be seen that the tension member is sufficiently taut that it does not extend along the seafloor in the quiescent position of the vessel. Each tension member has an upper portion 40 that is coupled to the bow 42 of the vessel, opposite the stern 43, with the upper portion of the first tension member 24 being shown. The tension members extend in different headings (North, South, East, West, and directions in between) from the vessel towards the seafloor. The upper portion 40 of the tension member extends around a pulley 44 to a chain locker 46 in which chain can be stored or removed. FIG. 1 shows the tension members and fluid conduit extending through a turret 50 at the bow, and also shows a turret at 52 lying in a moonpool within the vessel hull.

Figure 2:
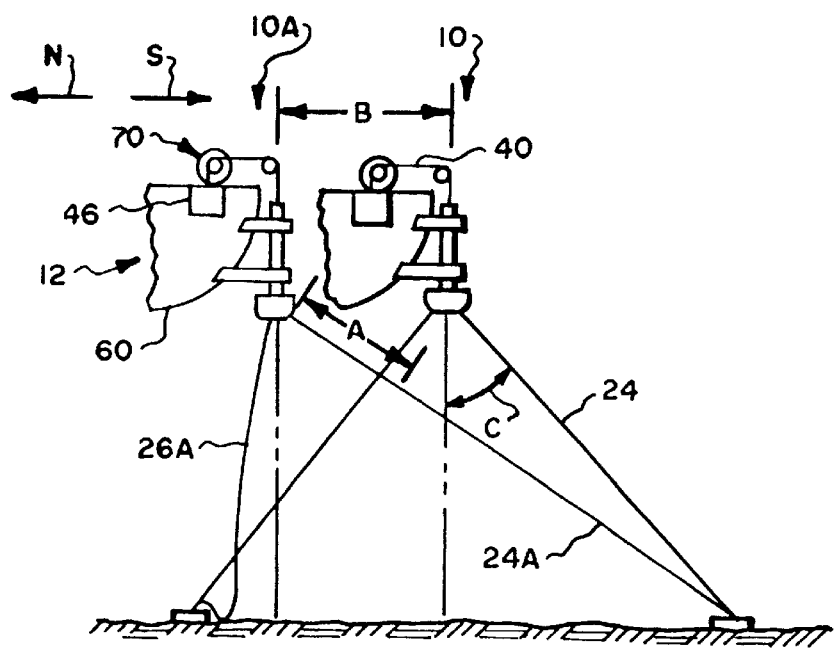
FIG. 2 is a partial side elevation view of the system of FIG. 1, showing the vessel in its quiescent position and in a drifted position.

FIG. 2 shows the system at 10 in a quiescent position, which it assumes in quiet seas. FIG. 2 also shows the drifted vessel at 10A, which has drifted north N as a result of forces encountered in a storm. As the storm applies northward N forces to the hull 60 of the vessel, the upper portion 40 of the mooring line is payed out from the vessel. As a result, the mooring line assumes the position 24A wherein it has been elongated by the distance A during drift of the vessel by the distance B. Such elongation occurs by pay out of the chain or other tension member from a chain locker 46. It may be noticed that the other tension members such as the second one at 26A become limp. Because of the considerable angle C of the first tension member 24 from the vertical in its initial quiescent position, the tension member 24 can apply a considerable horizontal mooring load that resists vessel drift. The amount of vessel drift should be kept low, to minimize bending of the fluid conduit 16. Additional drift results in more bending of the conduit 16, so that a longer conduit would be needed and it would be subjected to greater stresses resulting in a shorter life due to fatigue failure. In addition, by limiting the amount of drift, applicant limits the total lengths of the tension members 24, 26, 28 that are required, to thereby reduce the cost of the system. As will be described below, the system includes a brake mechanism 70 that absorbs energy from the tension member 24 as the tension member is payed out from the vessel, to produce a significant reduction in maximum vessel drift.

Figure 3:
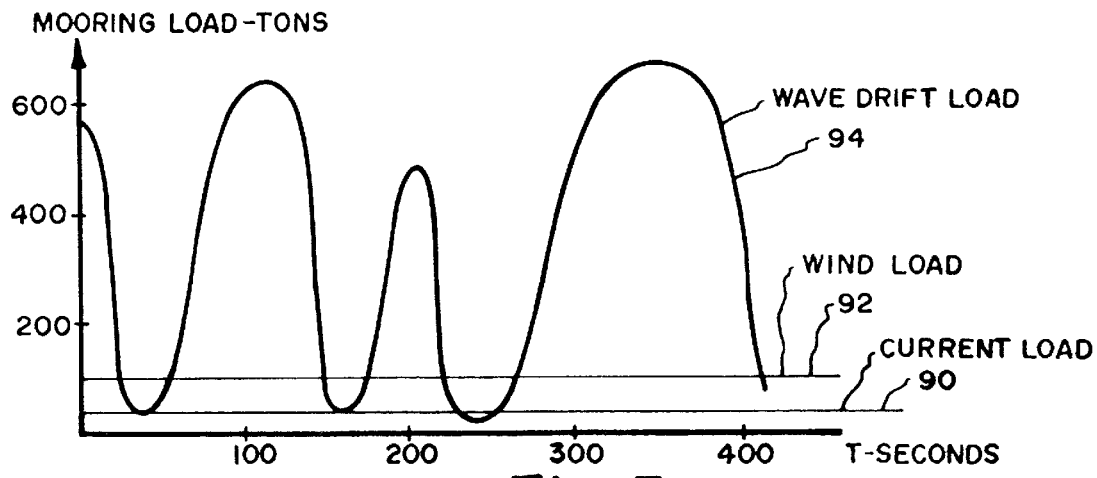
FIG. 3 is a graph with graph lines showing different mooring loads on the vessel of FIG. 1, as a function of time.

FIG. 3 shows the mooring load in tons, as a function of time, for a vessel having a displacement of perhaps 25000 tons, and a length of perhaps 200 meters, in a storm. Acting on the vessel is a load indicated by graph line 90 representing water currents. Graph line 92 shows the wind load. Both the current and wind loads are substantially constant over periods of many minutes. A graph line 94 shows the wave drift load, which varies over periods on the order of magnitude of 100 seconds. The wave drift load is the net load on the vessel as a result of numerous largely successive waves acting on the vessel. The period of the oscillating wave drift load is of the same order of magnitude as the natural frequency of response of the vessel, which is also about 100 seconds.

The most common type of large vessel mooring systems in use include catenary chains extending to the seafloor and hundreds of meters along the seafloor to an anchor. As the wave drift load repeatedly changes the mooring force on the vessel, this is countered by the pickup and lay down of chain from the seafloor. In the event that the period of wave drift load is close to the natural period of oscillation of the system in drift, then the drift length and load on the vessel can increase greatly. The catenary chain acts like a spring urging the vessel back towards a quiescent position, while the wave drift load can act like a load that is repeatedly applied and removed from the vessel. The damping of catenary anchor leg moored systems is about 10%. Such damping arises from friction of the vessel and chains as they move through the water, friction in the chain links as they pivot, etc. This relatively modest damping can result in significant resonant effects.

Figure 4:
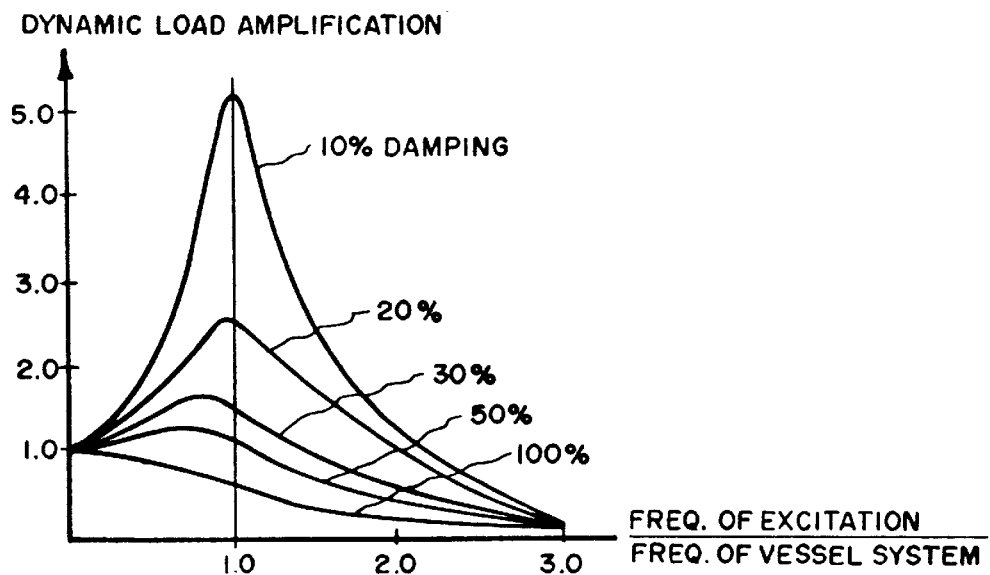
FIG. 4 is a graph showing dynamic load amplification as a function of the ratio of excitation frequency to natural frequency, for different damping percentages.

FIG. 4 is a graph showing dynamic load amplification as a function of the ratio of wave drift load excitation to the natural frequency of the system. The worse case is where the frequency of the wave drift load equals the natural frequency of oscillation of the system, at 1.0. For 10% damping, such excitation near the natural frequency of the system results in five times the load that would occur in the absence of excitation at the natural frequency. As a result, a wave drift load that would normally apply a mooring load of 500 tons, could result in a mooring load of up to 2500 tons on the vessel. The offshore system must be designed to withstand the worse case conditions, so that very heavy chains are used. It is noted that there have been proposals to apply wings to the hull of a vessel to increase its damping, but such devices increase the water current load on the vessel.

In accordance with the present invention, applicant minimizes dynamic load amplification by increasing damping, which reduces vessel drift response at the natural frequency of excitation of the system. This is accomplished by the brake mechanism 70 shown in FIGS. 5 and 6, which damps vessel drift. During pay out of the upper portion 40 of the tension member 24, applicant applies the brake mechanism 70 to absorb energy. The brake mechanism includes a disk brake 72, brake shoes 74 and an operator 76. When the vessel is drifting so the tension member 24 is being payed out, the operator 76 is activated to apply a braking force to the pulley 44, to allow such pay out but to increase tension in the tension member 24 to slow drift of the vessel. Thus, the braking force applied by the brake mechanism 70 and frictional resistance of the vessel with water as it moves, results in the vessel drifting at only a moderate speed. The braking force is adjusted so the tension in the tension member 24 is close to the design limit during pay out. This results in damping of perhaps 50 to 100 percent, or even overdamping. As a result, wave drift excitation at the natural frequency of oscillation of the system does not result in dynamic load amplification and keeps the mooring loads close to that of the excitation.

Figures 5, 6:
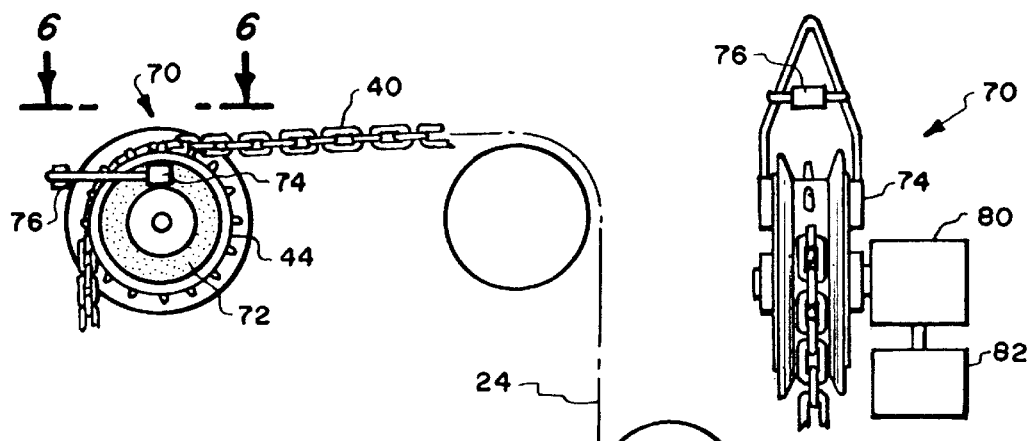
FIG. 5 is a side elevation view of a portion of the system of FIG. 1.
FIG. 6 is a view taken on line 6—6 of FIG. 5.

FIG. 6 also shows that the braking system 70 includes a hydraulic motor-pump, or motor-generator 80, to extract energy and an energy storage device in the form of a hydraulic accumulator 82. In addition to absorption of energy by heating of the brake disks 72 and shoes 74, applicant can absorb some (or even all) of the energy resulting from pay out of the tension member 24, by using the pulley 44 to drive the motor 80. The motor pumps pressured fluid into a motor and accumulator 82. When the accumulator is full, further energy can be absorbed by the motor or by passing fluid through a narrow orifice and using sea water to cool the heated fluid. After the wave drift load decreases to a moderate level, pressured fluid from the accumulator 82 may be passed back to the hydraulic motor 80, so it turns the pulley 44 in a direction to draw in the tension member 24 and again store an upper portion of it in the chain locker. During this draw in of the tension member 24, the brake shoes 94 are not pressed against the disk brakes. It is noted that a separate braking mechanism such as 70 can be used for each of the three tension members 24, 26, 28 of FIG. 1, and the braking mechanism 70 can be applied only to a tension member being payed out and which is then drawn in.

Figure 7:
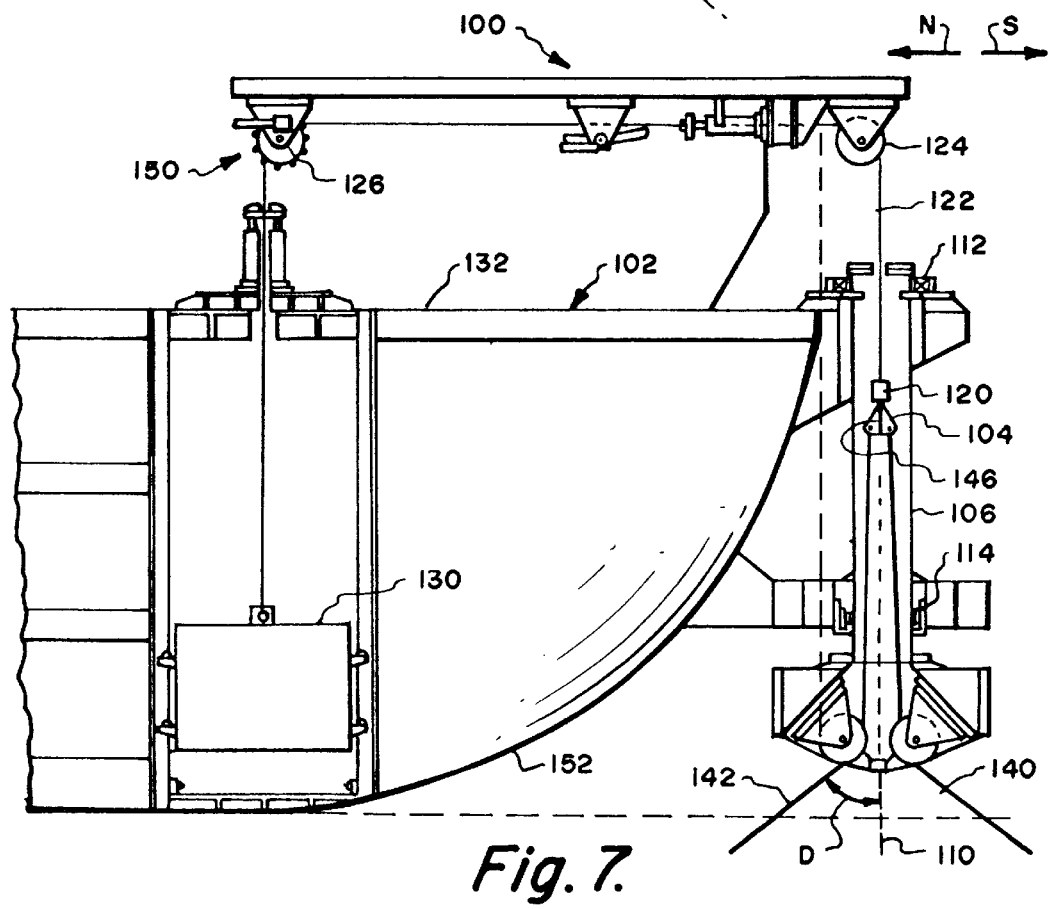
FIG. 7 is a sectional side view of a portion of an offshore system constructed in accordance with another embodiment of the invention.
Figure 8:
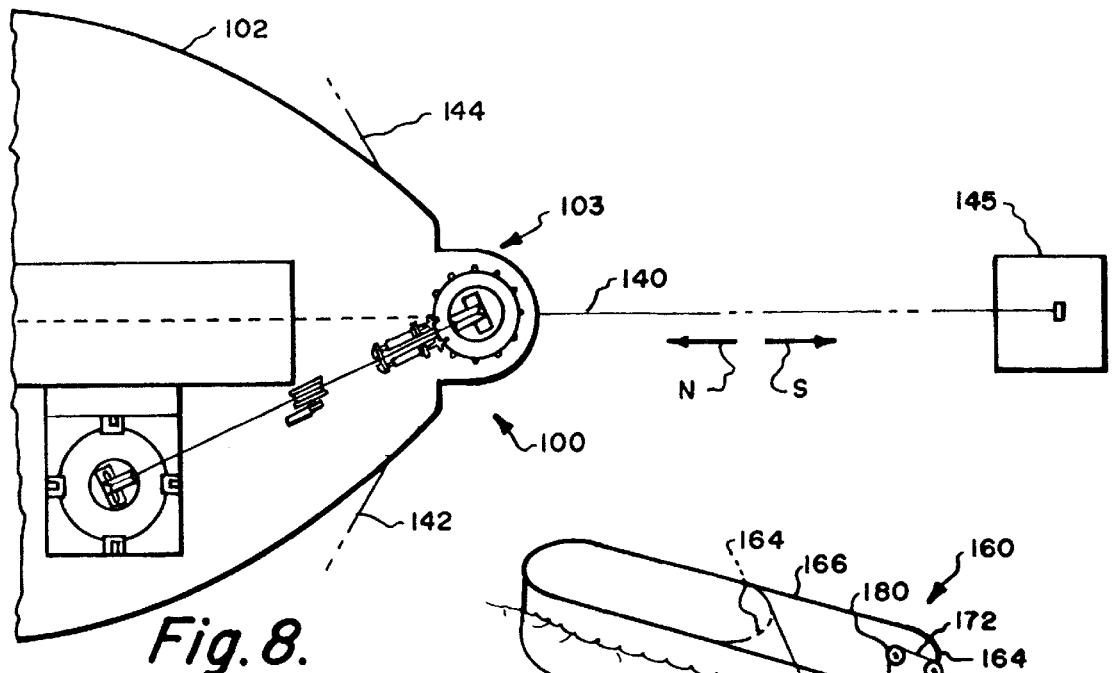
FIG. 8 is a plan view of a portion of the system of FIG. 7.

FIGS. 7–8 illustrate another system 100 that includes a vessel 102 with an apparatus 103 for mooring the vessel. The apparatus for mooring the vessel includes a plunger 104 that can move up and down within a turret 106. The turret is rotatable about a vertical axis 110 on upper and lower bearings 112, 114. The upper end of the plunger 104 is connected through a roller-bearing swivel 120 to a single cable 122. The cable extends about a pair of pulleys or sheaves 124, 126 to a weight 130 that can move vertically within the hull 132 of the vessel (the system could be constructed to hang the weight below the vessel). Three tension members 140, 142, 144 (FIG. 8) extend in different headings from the lower end of the turret, and at downward inclines D of 50° from the vertical and 40° from the horizontal, to fixed locations such as 145 at the seafloor. The upper ends 146 of the tension members are tied to the plunger 104.

The vessel tends to remain in a position wherein all three tension members or lines 140, 142,144 are of the same length. When large mooring forces are applied in a direction such as N, the vessel drifts in the direction N. As a result, the plunger 104 moves down to increase the effective length of tension member 140 which is carrying the mooring load. The other tension members 142, 144 are also elongated, but they lie slack in the water. As the plunger 104 is pulled down to elongate the member 140, the cable 122 is pulled to raise the weight 130, so some of the energy resulting from forces on the vessel are stored in the weight 130 by raising its height. In addition, a brake mechanism 150 applies braking force to the sheave 126 when the cable 122 is payed out by raising the weight 130 and increasing the lengths of the tension members 140–144. The brake mechanism can be the same as 70 of FIGS. 5 and 6. The braking force applied by the brake 150 results in a high tension in the tension member 140 which is being payed out, to absorb considerable energy that would otherwise result in more rapid movement of the vessel. When the wave drift load decreases below a certain level, the weight 130 moves down and pulls up the plunger 104 to shorten all of the lines 140–144. The brake mechanism 150 may be applied during draw in of the cable 122 and of the tension members 140–144, depending on the amount of damping required. During draw in, any brake force will be less than that of the weight 130.

The vessel 102 can weathervane, so its bow end 152 faces current, wind, and wave loads. At any particular orientation of the vessel, a corresponding one or two of the tension members 140–144 slows vessel drift by being payed out while energy is removed from them.

Figure 9:
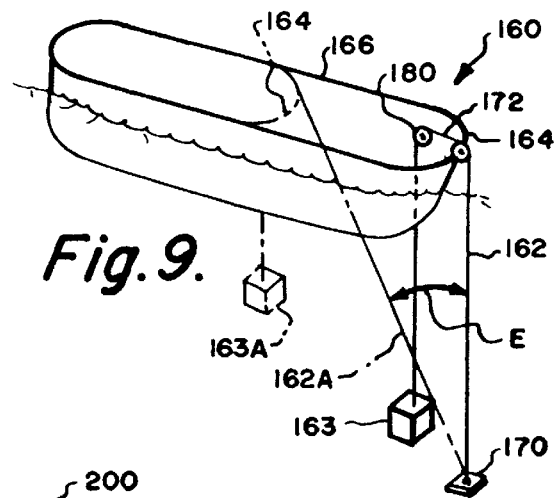
FIG. 9 is an isometric view of a system constructed in accordance with another embodiment of the invention, which uses a single mooring tension member.

FIG. 9 illustrates another system 160, which uses a single tension member 162 that extends from a weight 168 and around pulleys on a vessel 166, and from the bow 164 of the vessel to a fixed location such as a pile 170 on the seafloor. When the vessel drifts, an upper portion 172 of the tension member is payed out while the weight 163 is raised. Thus, when the bow drifts to the position 164A, the tension member 162 is elongated to the position and orientation 162A while the weight is raised to position 163A. A brake mechanism 180 absorbs energy from the tension member being payed out, to slow drift of the vessel. The system of FIG. 9 has the advantage that it is simple and uses very little length of chain or other tension member 162. However, the system has the disadvantage that it allows considerable drift of the vessel, since the vessel has to drift considerably from its quiescent position (where the tension member 162 is substantially vertical) before the angle E of the tension member from the vertical, is substantial so that a large component of tension in the tension member is in the horizontal direction. Only when the angle E is at least 20°, is the horizontal component of tension one-third that of total tension. As discussed above, in many cases a fluid conduit extends from the vessel to the seafloor, and in that case it is generally desirable to minimize drift of the vessel. Where no fluid conduit is used, the system of FIG. 9 results in efficient mooring.

Figure 10:
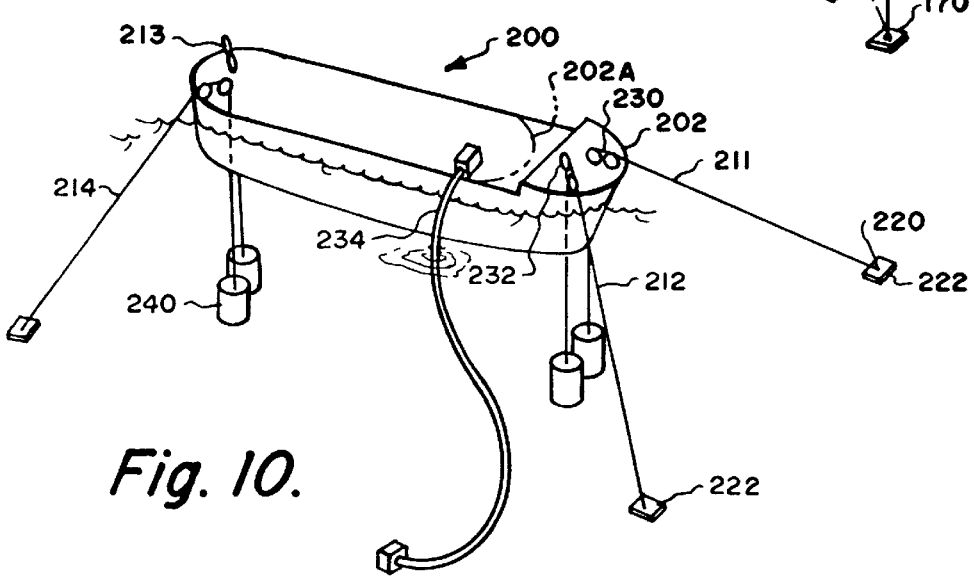
FIG. 10 is an isometric view of an offshore system of another embodiment of the invention, wherein a vessel is spread moored.

FIG. 10 illustrates a system 200 wherein a vessel 202 is spread moored by four tension members 211–214. Each tension member extends from the vessel and at a downward incline to the seafloor, and has its lower end 220 fixed to the seafloor, as by a pile 222. Piles 222 can be held in place merely by weight or by parts extending into the seafloor. The spread mooring system 200 results in minimum weathervaning of the vessel. However, it allows some vessel drift, as to the position 202A, by allowing a pair of tension members such as 211, 212 to elongate. During such elongation, the tension members are payed out of the vessel, while braking mechanisms such as 230, 232 absorb energy from the tension member being payed out. Each tension member is attached to a weight 240 that hangs from the vessel. Each weight maintains tension to urge a drifted vessel back towards its quiescent position. Spread mooring has the advantage that there is no twisting of the fluid conduit 234.

Figure 11:
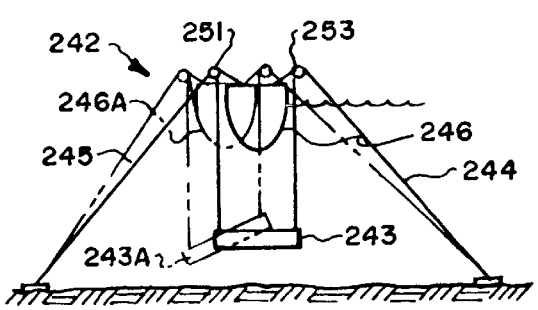
FIG. 11 is a front view of an offshore system of another embodiment of the invention, where two tension members are connected to a single weight.
Figure 12:
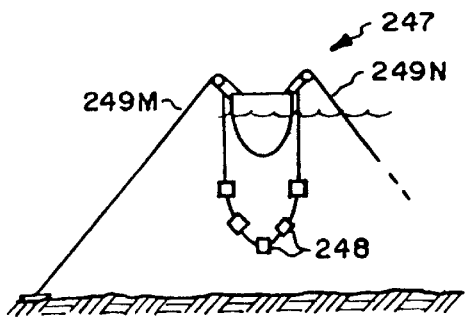
FIG. 12 is a front view of an offshore system of another embodiment of the invention where two tension members are connected to a group of weights.

FIG. 11 illustrates a system 242 with a weight 243, held by two tension members 244, 245 extending from a vessel 246 in opposite headings to piles at the seafloor. When the vessel drifts, as to position 246A, so one tension member shortens and the other lengthens, the weight tilts to position 243A. FIG. 12 illustrates a system 247 with a distributed weight 248 formed by a plurality of masses attached to two tension members 249M and 249N. In the systems 242 and 247 of FIGS. 11 and 12, the same weight draws in two different lines (which also occurs in FIG. 7 and 8), which makes efficient use of the weight. Braking mechanism 251, 253 are coupled to the tension members at pulleys. In most cases, it is desirable to provide at least three tension members extending in different headings, connected to the weight 243 or 248 to provide horizontal resistance in all directions.

A wide variety of braking mechanisms can be used to absorb energy from the tension member that is under high tension and that is being payed out. These include friction braking that turns the absorbed energy into heat, lifting of a weight which turns the absorbed energy into height potential energy (and which can be lowered even below the vessel hull), pumping of hydraulic fluid into a motor and an accumulator, or "pumping" electricity into a storage cell.

A wide range of tension members can be used, including chains or cables at their upper portions and even rigid rods at lower portions. It is even possible to use an elastic line, so some energy is absorbed by elastic elongation. Where a plurality of tension members extend in different headings from the vessel, it is possible to allow a drawn-in length of tension member (which is drawn in by a mechanism supported by the vessel) to be payed out in an opposite heading at about the same time as it is drawn in, which minimize the need for tension member storage and decreases the required length of the tension member.

Figure 13:
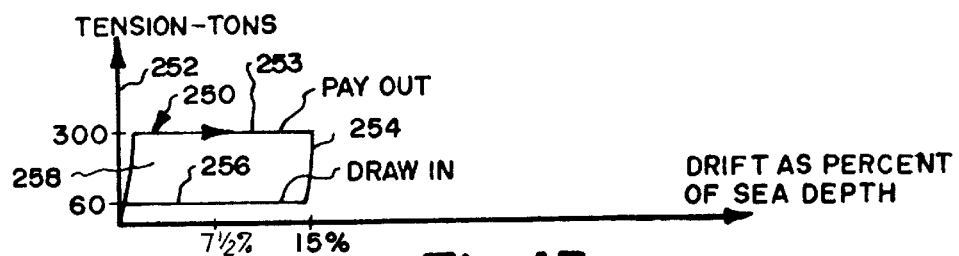
FIG. 13 is a graph showing tension member tension as a function of drift, or distance from the quiescent position of the vessel, as a percent of sea depth, for one of the present systems such as the system of FIGS. 7–8.

FIG. 13 is a graph 250 showing variation in tension (for line 140 in FIG. 8) with drift distance, in a system such as that of FIGS. 7–8, for a vessel of 25000 tons displacement (for drift in direction N). When there is only a moderate drift force on the vessel, which is less than 300 tons, the vessel does not drift substantially. This is because the brake mechanism (which applies 240 tons resistance) is applied in addition to the weight (of 60 tons). When the drift force exceeds 300 tons, at graph point 252, the tension member which is usually a chain, is payed out along line graph 253, so tension in the chain does not exceed 300 tons. The vessel moves at a speed dependent on wave drift force and other drift forces, but the drift speed may be only 0.3 knot because of the 300 tons of chain tension. When the drift force on the vessel decreases along the line 254, from above 300 tons to below 60 tons, the tension in the chain remains at 60 tons and the chain is drawn in as indicated at graph line 256.

The net energy absorbed and not returned by the braking mechanism is represented by the area 258 between the lines 253 and 256. Where a hydraulic motor (e.g. 80 in FIG. 6) is used, the draw in force may be higher than 60 tons, such as 150 tons. As a result, along the line 254 when the drift is about 15% of sea depth and the drift force is decreasing, the tension member can begin to be drawn in sooner and faster. It can be seen from FIG. 13 that the constant high line tension during line pay out, begins when the drift is less than half of 15% of sea depth, or in other words, at a drift of less than 7½% of sea depth.

Figure 14:
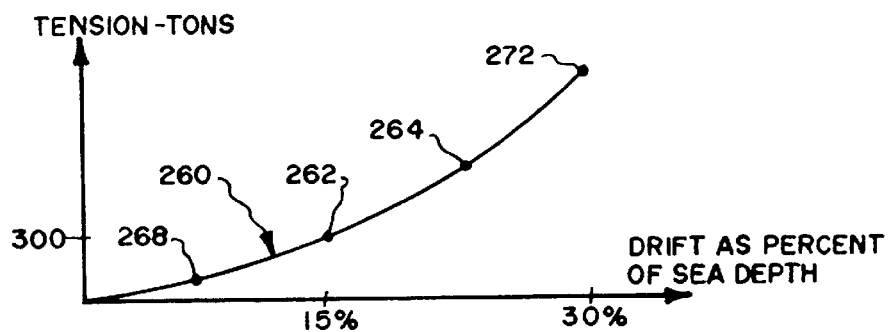
FIG. 14 is a graph similar to that of FIG. 11, for a prior art catenary anchor leg mooring system.

FIG. 14 is a graph 260 showing variation in tension with drift distance, for one prior art catenary anchor leg tension member. The vessel undergoes a drift of 15% (of sea depth) before a chain tension of 300 tons is reached at 262. If the drift force continues, and the vessel is moving at a considerable speed such as one knot at 262, the vessel will undergo additional drift before the increasing chain tension stops the vessel at 264, and moves it back along the path to location 268. It is assumed in FIG. 14 that at the end of the return path portion, at 268, large wave drift forces are again applied to the vessel, and that the vessel repeatedly moves to point 264. If the period of the successive drift forces are close to the natural period of the system, then the excursions of the vessel will increase, as to the point 272. This will result in very large drift and large tension in the chain. Applicant's system of FIG. 13 has large damping because of large braking force during chain payout, so large drift and large forces are not encountered when the wave drift period is close to the natural period of the system.

Figure 15:
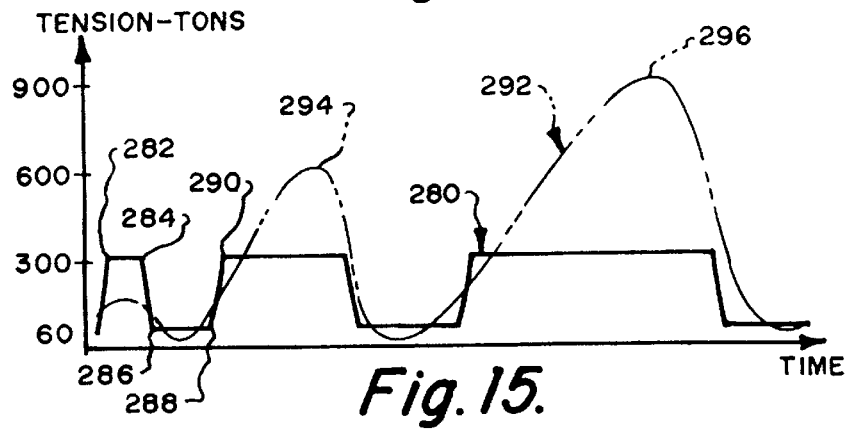
FIG. 15 is a graph showing in a simplified manner, tension member tension as a function of time, for the system of FIGS. 7–8, and showing in phantom lines a similar graph for a prior art catenary anchor leg mooring system.

FIG. 15 includes a graph line 280 that shows chain tension as a function of time near the beginning and middle of a storm, for the system of the present invention. The mass of the vessel that must be accelerated, plays a major role in the behavior and causes delays in response. Large wave drift is applied to the same vessel as for FIG. 13. Until the vessel starts to move at 282, essentially no vessel drift occurs. After point 282, the vessel begins to drift, with the chain tension limited to 300 tons, and with the vessel velocity being low. At 284, the vessel stops moving and the mooring tension drops to 60 tons. At 286, vessel motion starts which is opposite to that of wave drift, but chain tension continues at 60 tons which equals the weight (where a weight is used) and the chain is drawn in. At 288, the drift motion stops and the vessel is no longer pulled back, but is also not allowed to drift. At 290, the vessel starts moving and tension increases to 300 tons, the vessel is allowed to drift, and the vessel may reach a velocity of perhaps 0.2 knots. It is noted that there is little time between points such as 288 and 290 when the tension rises from 60 tons to 300 tons. It is noted that in the system of the present invention, the mooring line tension depends on vessel motion rather than on drift distance from the equilibrium, or quiescent position. In the prior art the mooring line tension depends on drift distance.

FIG. 15 also includes a graph line 292 indicating variation in chain tension with time for a prior art catenary mooring system. It can be seen that the mooring force is higher at 294 and 296, largely due to the higher vessel speed and to a vessel position far from the quiescent position (as the vessel is getting closer to maximum drift). The line 292 does not indicate the even higher tension encountered when the wave drift period is close to the system resonant period.

The graphs of FIGS. 13–15, and especially FIG. 15, show that applicant's system reduces vessel drift and the maximum tension that chains or the like must withstand.

Thus, the invention provides an offshore system that includes a vessel and apparatus for mooring the vessel, which minimizes amplification of the effects of wave drift load on a large vessel, of more than 10 tons and usually more than 50 tons, and a length of more than 15 meters. The apparatus for mooring the vessel includes at least one tension member having a lower portion coupled to the seafloor and an upper portion coupled to the vessel. The upper portion of the tension member (or an element coupled to it) is payed out to essentially lengthen the tension member when large sea loads on the vessel urge vessel drift. A brake mechanism is connected to the upper portion of the tension member to apply a braking force (of a plurality of tons) that resists pay out of the tension member, to thereby absorb energy that reduces the speed of vessel drift. Accordingly, the vessel moves at only a moderate speed as it drifts, so much of the sea forces on the vessel are absorbed by braking of the line being payed out as well as friction of the vessel in water. After a large wave drift load decreases, the tension member is drawn back (with a force of a plurality of tons to pull back the vessel toward its quiescent position). Although the upper end of even a catenary chain could be payed out and drawn back in, applicant prefers to fix the lower end of the tension member to a particular location at the seafloor. Where the vessel is connected to the seafloor by a flow line, the system preferably includes a plurality of tension members, usually at least three, with all tension members extending at an angle of more than 20° from the vertical in the quiescent position of the vessel, so that a considerable portion of tension in the tension member results in a horizontal component that restrains vessel drift.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An offshore system for use in a sea having a sea surface and a sea floor, comprising:
   a vessel that floats at the sea surface;
   a plurality of tension members with each tension member having an upper portion forming a line that is coupled to said vessel and with each tension member extending at a downward incline of at least 20° to the vertical to the sea floor in a quiescent position of the vessel, and having a lower end, said tension members extending in different headings from said vessel and each tension member lower end being fixed to a location on the sea floor;

apparatus coupled to said lines for paying out and drawing in said lines, including means for absorbing energy from a tensioned line that is under high tension and that is being payed out while it is under high tension;

said tension members extending with sufficient tautness in said quiescent position and said means for absorbing energy being constructed, so when the vessel drifts a predetermined distance from said quiescent position, said tensioned line is payed out and said means for absorbing energy absorbs energy along a majority of said predetermined distance of drift.

2. The system described in claim 1 wherein:
said predetermined distance is at least 7½% of the depth of the sea under said vessel in said quiescent position.

3. The system described in claim 1 wherein:
said predetermined distance is at least 15% of the depth of the sea under said vessel in said quiescent position.

4. The system described in claim 1 wherein:
said apparatus includes means for ceasing to absorb energy from movement of said line when said line is drawn in.

5. The system described in claim 1 wherein:
said inclined tension members are sufficiently taut that they are free of extension along and on said sea floor in said quiescent position.

6. The system described in claim 1 wherein:
said apparatus is constructed so it applies a predetermined high tension during line pay out, and applies a tension during line draw in that is no more than half of said predetermined high tension.

7. The system described in claim 1 wherein:
said braking means is constructed so it applies at least a predetermined high tension during line pay out, that the total damping of said vessel during line pay out and vessel drift, is at least 50%.

8. An offshore system for use in a sea having a sea surface and a sea floor, comprising:
a vessel that floats at the sea surface;
a fluid conduit extending from said vessel to the sea floor to carry fluid therebetween;
a plurality of tension members with each tension member having an upper portion forming a line and coupled to said vessel and with each tension member extending at a downward incline of at least 20° to the vertical to the sea floor in a quiescent position of the vessel, and having a lower end, said tension members extending in different headings from said vessel and each tension member lower end being fixed to a location on the sea floor;
means coupled to said upper portions of said tension members and to said vessel for paying out and drawing in said lines while absorbing energy from movement of a line that is under high tension and that is being payed out;
said tension members being sufficiently taut in said quiescent position and said means for paying out and drawing in said lines constructed to pay out at least one of said lines, when a predetermined tension level is reached in said one line, where said predetermined tension level is chosen so that when the vessel drifts by a distance that is at least 7½% of the sea depth said one line is payed out and energy is absorbed along a majority of said vessel drift.

9. The system described in claim 8 wherein:
said predetermined tension level is chosen so the line is payed out and energy absorbed along a majority of vessel drift, when the vessel drifts by a distance that is at least 15% of the sea depth.

10. An offshore system for use in a sea having a sea surface and a sea floor, comprising:
a vessel that floats at the sea surface;
a fluid conduit extending from said vessel to the sea floor to carry fluid therebetween;
a plurality of tension members with each tension member having an upper portion forming a line and coupled to said vessel and with each tension member extending at a downward incline of at least 20° to the vertical to the sea floor in a quiescent position of the vessel, and having a lower end, said tension members extending in different headings from said vessel and each tension member lower end being fixed to a location on the sea floor;
means coupled to said upper portions of said tension members and to said vessel for paying out and drawing in said lines while absorbing energy from movement of a line that is under high tension and that is being payed out;
said tension members being taut in said quiescent position and said means for paying out and drawing in said lines constructed to pay out at least one of said lines when a predetermined tension level is reached in said one line, where said predetermined tension level is chosen so that said means for paying out begins to payout said at least one line when said vessel drifts a predetermined short distance from said quiescent position, and wherein energy is absorbed along a majority of said vessel drift.

11. The system described in claim 10 wherein:
said predetermined short distance from the quiescent position at which said means for paying out begins to pay out said at least one line is less than 15% of the sea depth.

12. An offshore system for use in a sea having a sea surface and a sea floor, comprising:
a vessel that floats at the sea surface;
apparatus in said vessel for paying out and drawing in mooring lines;
a plurality of mooring lines that each has an upper end coupled to said apparatus for paying out and drawing in said mooring lines, and with each mooring line extending at a downward incline to the sea floor and having a lower end, said mooring lines extending in different headings from said vessel with each mooring line lower end being fixed to a location on the sea floor;
said apparatus including a plunger on said vessel with each of said mooring line upper ends connected to said plunger, said plunger being moveable in first and second directions to pull up and let down all of said mooring line upper ends, with said plunger lying in a quiescent position when the seas are calm;
draw-in means coupled to said plunger for urging said plunger in said first direction, to move said plunger in said first direction after it has moved a distance in said second direction;

braking means for resisting movement of said plunger in said second direction while absorbing a large amount of energy from line movement for a given movement of said plunger in said second direction but not when said plunger moves in said first direction back toward a quiescent position.

13. The system described in claim 12 wherein:

said plunger moves primarily vertically;

said draw-in means comprises a weight that can move up and down with respect to said vessel, a plurality of pulleys, and a cable device having one end connected to said weight and extending around said pulleys to said plunger.

14. A system for mooring a vessel in a sea that has a sea surface and a sea floor, in the event of a storm, comprising:

a plurality of tension members extending in different headings from said vessel to the sea floor, with each tension member having a lower end fixed to the sea floor, and with each tension member extending at an incline of more than 20° to the vertical in a quiescent vessel position;

means coupled to said vessel and to said tension members for paying out the upper portion of at least one of said tension members from said vessel to allow said vessel to drift from a quiescent position in the event of a storm while applying a braking force to the upper portion of said at least one tension member to maintain a predetermined constant high tension in said at least one tension member during pay out;

said means is constructed to automatically draw in said upper portion of said at least one tension member to pull said vessel back toward said quiescent position when the drift force falls below a second level that is less than half said predetermined high tension.

15. The system described in claim 14 wherein:

said tension members are sufficiently taut that they do not extend along the seafloor in the quiescent vessel position.

16. The system described in claim 14 wherein:

said tension members are sufficiently taut compared to said predetermined high tension, that said means begins to pay out said line when vessel drift from said quiescent position exceeds a drift that is less than 7½% of sea depth.

17. A method for mooring a vessel in a sea that has a sea surface and a sea floor, in the event of a storm, comprising:

establishing a plurality of tension members so each extends in a different heading from said vessel to the sea floor and each has a lower end fixed to the sea floor, and with each tension member extending at an incline of more than 20° to the vertical in a quiescent vessel position;

in the event of a storm that results in wave action that urges drift of said vessel in a first heading away from a quiescent position, paying out the upper portion of at least one of said tension members from said vessel to allow said least one tension member that extends at least partially opposite to vessel drift to resist pay out and damp vessel drift and thereby reduce overall vessel drift;

after the event of said vessel drift, drawing in said upper portion of said at least one tension member to said vessel and moving said vessel back toward said quiescent position;

said step of applying a braking force occurring during a majority of a vessel drift of at least 7½% of the sea depth.

18. The method described in claim 17 wherein:

said step of applying a braking, occurs during a majority of a vessel drift of at least 15% of the sea depth.

* * * * *